United States Patent
Syrgabaev

(10) Patent No.: US 9,360,680 B1
(45) Date of Patent: Jun. 7, 2016

(54) ELECTROMAGNETIC BEAM OR IMAGE STABILIZATION SYSTEM

(71) Applicant: Ilias Syrgabaev, Newtown, PA (US)

(72) Inventor: Ilias Syrgabaev, Newtown, PA (US)

( * ) Notice: Subject to any disclaimer, the term of this patent is extended or adjusted under 35 U.S.C. 154(b) by 270 days.

(21) Appl. No.: 13/964,053

(22) Filed: Aug. 10, 2013

Related U.S. Application Data

(60) Provisional application No. 61/681,974, filed on Aug. 10, 2012.

(51) Int. Cl.
*G02B 27/64* (2006.01)
*G01J 1/02* (2006.01)
*H01S 3/00* (2006.01)

(52) U.S. Cl.
CPC ............. *G02B 27/648* (2013.01); *G01J 1/0266* (2013.01); *H01S 3/0071* (2013.01)

(58) Field of Classification Search
CPC ..... G02B 27/648; G01J 1/0266; H01S 3/0071
USPC ....................................................... 250/578.1
See application file for complete search history.

(56) References Cited

U.S. PATENT DOCUMENTS

| | | | |
|---|---|---|---|
| 3,653,737 A | 4/1972 | Stripling | |
| 3,752,998 A | 8/1973 | Stripling | |
| 3,917,381 A | 11/1975 | Feigin | |
| 3,950,079 A | 4/1976 | Rambauske | |
| 4,021,031 A * | 5/1977 | Meihofer | B65H 23/0326 226/20 |
| 4,091,814 A | 5/1978 | Togo | |
| 4,318,584 A | 3/1982 | Ando | |
| 4,322,128 A | 3/1982 | Brake | |
| 4,465,346 A | 8/1984 | Fraser | |
| 4,975,573 A | 12/1990 | Girard | |
| 5,008,606 A | 4/1991 | Koehler | |
| 5,037,191 A | 8/1991 | Cheng | |
| 5,197,691 A | 3/1993 | Amon | |
| 5,889,626 A | 3/1999 | Fuse | |
| 6,069,656 A | 5/2000 | Silver | |
| 6,078,420 A | 6/2000 | Macken | |
| 6,347,010 B1 | 2/2002 | Chen | |
| 6,370,329 B1 | 4/2002 | Teuchert | |
| 6,516,116 B1 | 2/2003 | Murray | |

(Continued)

FOREIGN PATENT DOCUMENTS

| | | |
|---|---|---|
| JP | 09-113262 | 5/1997 |
| JP | 11-166969 | 6/1999 |

*Primary Examiner* — Renee D Chavez
(74) *Attorney, Agent, or Firm* — Muskin & Farmer LLC

(57) ABSTRACT

An electromagnetic beam stabilization device comprises a parabolic mirror fixed within a gimbal so that the focal point of the parabolic mirror coincides with the gimbal's center of rotation, and an electromagnetic beam emitter, such as a laser, positioned so that a beam maintains focus on a point substantially at the center of rotation and thereafter strikes the parabolic mirror. The beam's focal point may be repositioned using repositioning optics like a flat mirror. An image stabilization device comprises a parabolic mirror fixed within a gimbal so that the gimbal's center of rotation coincides with the focal point of the parabolic mirror, and an image sensor having an image plane that coincides with the focal plane of the parabolic mirror. The parabolic mirror's focal plane may be reimaged using reimaging optics like an elliptical mirror. The laser stabilization and image stabilization features may be combined in a single device.

7 Claims, 8 Drawing Sheets

(56) References Cited

U.S. PATENT DOCUMENTS

| | | |
|---|---|---|
| 6,549,332 B2 | 4/2003 | Kimura |
| 6,798,494 B2 | 9/2004 | Naulleau |
| 6,894,818 B1 | 5/2005 | Cicchiello |
| 7,358,498 B2 | 4/2008 | Geng |
| 7,553,048 B2 | 6/2009 | Wilson |
| 2003/0012248 A1 | 1/2003 | Akerlund |
| 2005/0128749 A1 | 6/2005 | Wilson |
| 2009/0147239 A1 | 6/2009 | Zhu |

* cited by examiner

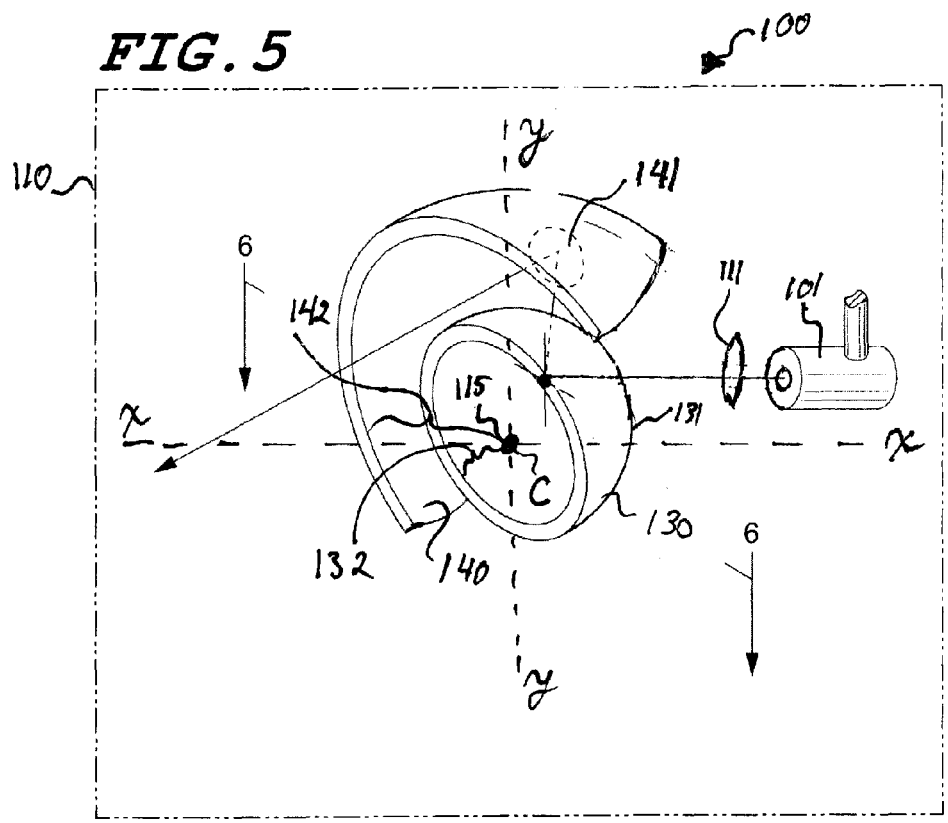
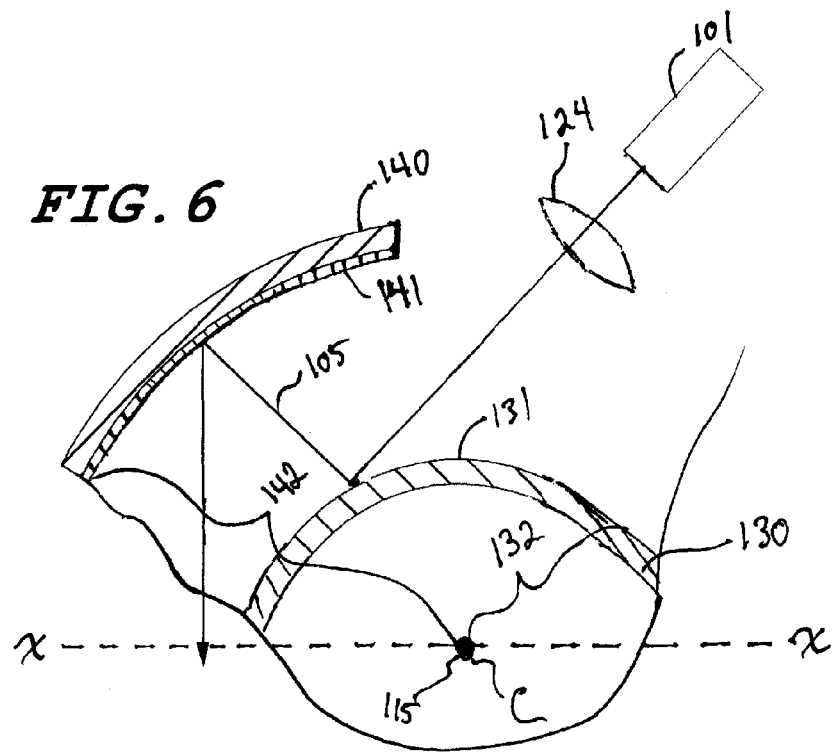

ELECTROMAGNETIC BEAM OR IMAGE STABILIZATION SYSTEM

FIELD OF THE INVENTION

The present invention relates to optics; more specifically long-range projection of coherent electromagnetic waves, such as laser beams, and long-range image magnification and viewing, particularly laser range finding, targeting and telescopic viewing for both military and civilian applications. The current invention further relates to a means to enhance the stabilization of coherent electromagnetic waves like projectors and lasers as well as long-range, magnified images.

BACKGROUND OF THE ART

The use of telescopes and binoculars to see far-away targets with clarity and precision is well known. In the case of long-range laser targeting, a common military practice, a soldier on the ground holds a laser beam on the desired target and a second soldier in a separate location, such as in an aircraft, shoots a laser-guided projectile in the general direction of the target. The projectile locks onto the laser "dot" on the target and thus is guided to remain on target all the way to impact. The challenge is to keep the laser "dot" from moving off the target, to keep the laser-guided projectile from missing the intended target and striking an unintended structure, object or person.

Viewing a far-away object is similar to striking a far-away target with a laser beam in that both involve light traveling over a distance to a rather precise spot. In the case of long-range image magnification (viewing a far-away object), the light originates at the "target" (the object to be viewed) and travels to the optics (e.g., the viewer's eyepiece), whereas with laser targeting, the light originates at the user's laser pointer device and travels to the target. It should be noted here that the adjective "telescopic" and the noun "scope" will be used to describe image viewing when the viewed object as seen through the scope appears closer than it actually is. "Observer," "sensor" and "viewer" will be used interchangeably here to mean any person or device that is receiving an image, including when said image is a laser dot.

A common problem with both telescopic viewing and laser targeting is that angular error introduced by movements of the person, object or vehicle holding the viewing device or laser pointer is amplified by the distance between the device and the target. Relatively small angular movements in any direction are increased proportional to the distance between the observer and the target. In the case of scopes, the result is a loss of visual acuity and clarity. The image viewed is so shaky and blurred relative to the original image that the viewer cannot perceive the image in the detail desired. The amplification of these angular movements over several miles can result in an image that is so shaky and blurred that the image is completely obscured. In the case of targeting, the result is a target "dot" that jumps around by as much as several meters, even jumping off target entirely, and failing to provide a stable and reliable guide for the projectile. Clearly, the ramifications of this error are tremendous; one would expect a laser guided projectile to adequately locate its target, but with such an unstable laser dot, such accuracy is impossible. As such, there is a great need in the art for a means to stabilize the viewing or pointing device, thus increasing the accuracy of lasers and the clarity of telescopic images.

The current practice is to refract the light rays (whether from the image or the laser) through a glass prism mounted within a bi-directional gimbal system that stabilizes the prism in two directions perpendicular to one another across the optical axis of the device. See U.S. Pat. No. 4,465,346 and U.S. Pat. No. 4,318,584. In some cases, the gimbal is further stabilized by a gyroscope. This practice is insufficient for resolving the problems stated above, as said practice requires bulky and inconvenient materials, while still failing to provide the clarity and image strength desired. Specifically, the use of glass prisms and the gimbals that are standardly employed are somewhat effective but fail to adequately solve the problems in the field.

In particular, glass prisms are wavelength-specific, meaning use of different lasers (red vs. green vs. infrared, for example) requires a different prism for each laser wavelength. This is especially problematic in that glass prisms are comparatively heavy and add undesired weight to the device. Additionally, as glass is by nature fragile, a prism is susceptible to chipping or breaking. Moreover, glass prisms absorb some light, meaning less light reaches the observer or the target, resulting in a weaker "dot" signal or image.

Most systems in current use have gimbals with servo motors and motion detection to feedback to the motors, creating a "reactive" system that stabilizes the gimbal. The system will naturally deviate through the angular motion referred to before or through an alternative source of motion; the deviation is then detected; and finally the motion is corrected via servo motors. Such systems are bulky and, while they may decrease the angular motion somewhat by reacting and correcting it via the servo motions, they are imperfect in that they do not prevent the angular motion amplification, resulting in a similar loss of accuracy. Moreover, the greater the weight of the gimbal and optics within the gimbal, the greater the load on the motors, which ultimately impacts the weight and energy usage of the system.

Therefore, there is a need for an apparatus or system that is comparatively lightweight, is useful at all wavelengths, results in increased clarity, and provides a strong signal.

SUMMARY OF THE INVENTION

The present invention solves some or all of the problems identified above by using a system of mirrors and gimbals in a novel manner. In essence, a combination of gimbals and mirrors are arranged so as to exploit their opticomechanical capabilities for the purpose of transferring significant angular movements, such as those caused by hand tremors or bumpy terrain, into insignificant lateral movements. "Lateral" here is used in the sense that the movement is lateral to the optical axis of the device. Insignificant lateral movements (e.g., lateral movements of a few millimeters) are not amplified even over a few kilometers, so they result in insignificant movement of the dot or image and are preferable to the abovementioned angular amplification, which results in disruptive, significant movement of the dot or image over a distance.

As in the prior art, a gimbal having at least two perpendicular axes crossing the optical axis of the device is used. More than two axes may be used, with additional axes of rotation increasing the stabilization capabilities (but also the weight) of the device. The gimbal may be stabilized by known means such as a gyroscope or servo motors. The point at which the gimbal's axes intersect is herein called the gimbal's "center of rotation." Stabilizing optics are fixed within the gimbal so as to remain stationary relative to the target and horizon and isolated from movement of the device. Movement of the device can therefore be thought of as rotation around the gimbal and the optics fixed inside or in relation to the gimbal. By fixing the stabilizing optics within a gimbal, they are isolated from the movements of the device housing and/or the vehicle, person or object holding the device. The stabilizing optics commonly used are prisms, which have limitations as described above. In the present invention, the stabilizing optics are mirrors, lenses, or a combination thereof.

In an example embodiment of the invention, at least one parabolic mirror is fixed within the gimbal such that its focal point is the gimbal's center of rotation. An electromagnetic beam emitter, such as a laser emitter, is positioned opposite the parabolic mirror so that its focal point coincides with the focal point of the parabolic mirror, which also is the gimbal's center of rotation. Because all rays originating at a parabola's focal point will reflect off the parabola in parallel no matter at what angle they strike the parabola, so long as the beam maintains focus on the parabolic mirror's focal point (or passing through the mirror's focal point) and then strikes the mirror, any angular movement of the beam is translated to parallel lateral movement once the beam reflects off the parabolic mirror and travels out of the device toward the target. As noted above, lateral movement of a beam is not amplified over a distance and therefore is insignificant and results in a stabilized beam and, thus, a stabilized "dot" in the case of laser targeting and range finding.

In some applications, however, it may be impractical to fix the emitter in the exact position it would need to be in to maintain focus with the focal point of the mirror. For example, fixing an emitter within a gimbal may be impractical if the emitter is bulky and heavy. Therefore, repositioning optics such as a flat mirror, a system of flat mirrors, or a system of mirrors and lenses, may be used to reposition the beam's focal point to coincide with the gimbal's center of rotation and focal point of the parabola. In this way, the emitter may be placed wherever desired for packaging reasons, ergonomic reasons or other engineering or design reasons.

In another example embodiment an electromagnetic beam stabilization device includes a gimbal with at least two axes of rotation, with a mirror assembly that includes a convex spherical mirror, and a concave spherical mirror. The radius of the convex mirror is less than the radius of the concave spherical mirror. The two mirrors are fixed relative to the center of rotation of the gimbal, so that the center of the convex and concave spherical mirrors is approximately the center of the gimbal rotation. One or more electromagnetic beam emitter, such as a laser, is use to focus a beam on the convex spherical mirror, which is then reflected toward the concave spherical mirror. In this example the angular movements of the emitter are translated into lateral movements of the resulting beam that is aimed at the target.

In another example embodiment a focused electromagnetic beam stabilization device includes a gimbal, and at least one lens having a focal point fixed in relation to said gimbal. The focal point of the lens is at the center of rotation of the gimbal. A beam emitter, such as a laser, may be used that emits a beam with a focal point, where the focal point of the beam coincides with the focal point of the lens. In this example embodiment, when a laser beam passes through the focal point of the lens and then passes through the lens, it is redirected in the same direction even when the laser strikes a different part of the lens. In this way an angular movement is translated into a lateral movement that will have little or no magnification over a great distance.

Similarly, with image stabilization, which presents similar challenges in that angular movement results in a shaky or jumping image which interferes with clarity, the same principles and structures may be used. With image stabilization, the light (or other electromagnetic waves) from an "image" (as defined herein) travels to the device and ultimately is viewed (or detected) by a viewing element, which may be an eyepiece, camera or other electromagnetic wave detector of any configuration known to the art.

In an example embodiment for image stabilization, a parabolic mirror is fixed within a multiaxis gimbal so that the gimbal's center of rotation coincides with the focal point of the parabolic mirror. A view element is placed so that its viewing plane (the focal plane of the view element) coincides with the focal plane of the parabolic mirror.

As with electromagnetic beam stabilization, it is likely impractical to fix the view element in the exact position it must occupy to ensure its viewing plane coincides with the focal plane of the parabolic mirror. Therefore, reimaging optics, such as a flat mirror or a system of flat mirrors, or a system of mirrors and lenses, may be used to reposition the focal plane of the parabolic mirror to a more convenient location for the viewing plane of the view element.

An example embodiment with a system of mirrors and gimbals has significant advantages over the existing processes in the art. One advantage is that mirrors absorb only minimal amounts of light, significantly less light than prisms absorb, meaning the light reaching the viewer or target is significantly increased compared to devices which use prisms. A second advantage is the low weight of this system compared to systems using prisms, said low weight increasing the efficiencies throughout the system. Specifically, a lighter weight means that less energy is required to carry and/or hold the device, and less energy is needed to operate any motors incorporated therein, such as servo motors or gyroscope motors for stabilizing the gimbals. A third advantage is that mirrors may be made from shockproof materials such as various metals, including for example polished gold, reducing the likelihood that said mirrors would be damaged relative to prisms. Another advantage is that an example embodiment of the invention may be used without a feedback system as described previously, resulting in a simpler system delivering superior results and requiring less power.

Our novel system may be implemented in various ways using a variety of arrangements of said mirrors and gimbals, several variations of which are disclosed herein. It should be understood to one skilled in the art that angular amplification of movements is a problem in many related devices, such as collimated electromagnetic waves (i.e. laser) projectors, pointers, and range finders as well as long-range magnification and viewing devices.

The following terms as used throughout this application are here defined, for convenience. These definitions are intended to be clarifying and non-limiting.

The term "Image" is used throughout in connection with image stabilization, but it should be apparent to one skilled in the art that the principles of the invention would function as well with other electromagnetic waves traveling from an item to be detected to a detector capable of receiving and detecting such waves. Therefore, the term "image" as used herein should be understood to include not just visual light reflected from an object being viewed but also any electromagnetic wave traveling from an item to be detected and a detector (herein called a "view element") capable of detecting such electromagnetic wave.

"View element" is any device or assembly that can receive or detect an "image" for viewing (or detecting), such as an eyepiece, a mirror reflecting the image to an eyepiece, a system of mirrors reflecting the image to an eyepiece, a lens, a sensor such as an image sensor, or any combination thereof.

Many embodiments of the invention are directed toward stabilizing a laser beam, such as for laser targeting, range finding or pointing. However, it should be apparent to one of ordinary skill in the art that the principles of the invention apply equivalently to any electromagnetic beam. Therefore, the term "electromagnetic beam" is used.

"Center of rotation" is the point of intersection of all of a gimbal's axes of rotation. Drawing figures show two axes of rotation, but gimbals with more than two axes may be used and will result in greater isolation of the stabilizing optics from rotation (movement) of the device and, thus, greater stabilization of beams or images.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a front right isometric view of an alternate embodiment of the invention for beam stabilization using spherical mirrors.

FIG. 6 is a partial plan/diagrammatic view of the device shown in FIG. 5.

DETAILED DESCRIPTION OF THE PREFERRED EMBODIMENTS

Figure 1:
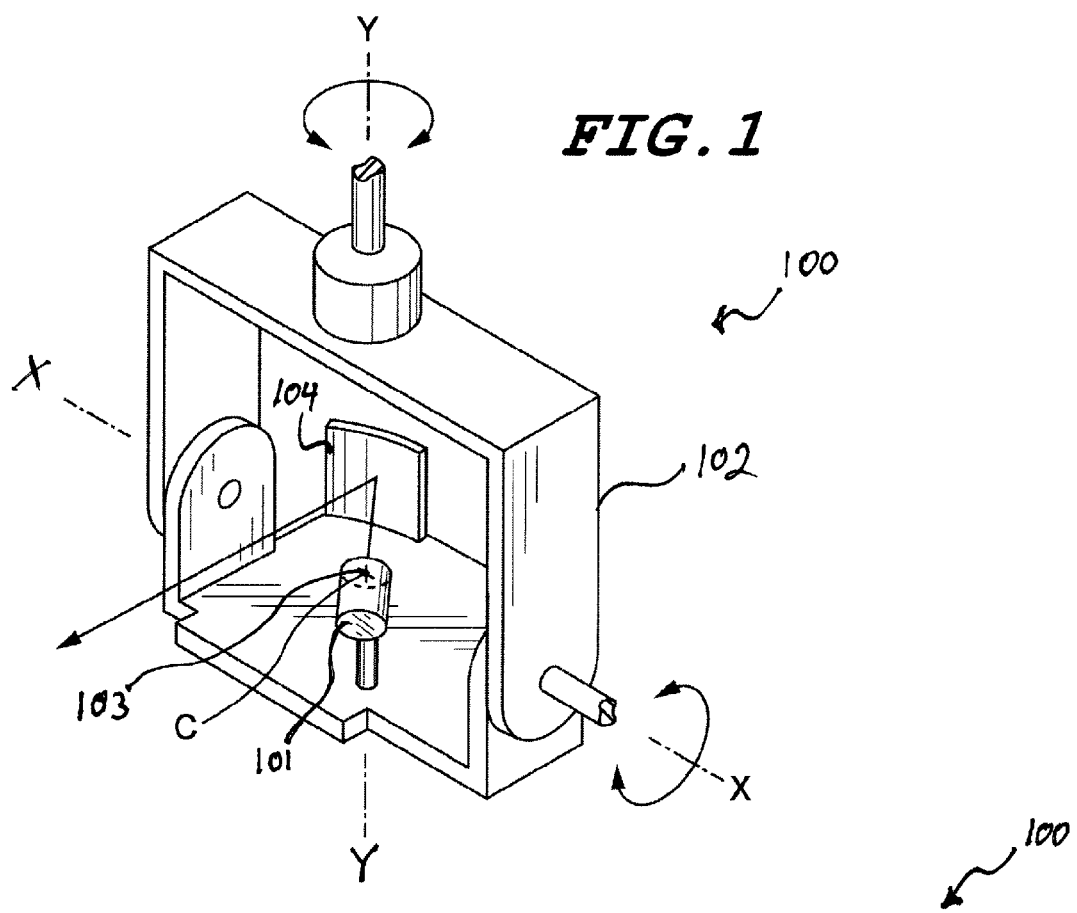
FIG. 1 is a front right isometric view of an embodiment of the invention for beam stabilization.

The principles and structures of the invention enable embodiments for electromagnetic beam stabilization 100, embodiments for image stabilization 200 and embodiments combining beam and image stabilization 300, among others. In some embodiments for beam stabilization, a parabolic mirror 104 is fixed within a multiaxis gimbal 102 such that its focal point 103 is the intersection of the gimbal's axes C (the gimbal's "center of rotation"). The gimbal 102 has an axis along the line X-X and another axis perpendicular to the X-X axis along the line Y-Y. The gimbal 102 keeps the stabilizing optics stationary relative to the target, image and horizon despite movement of the device. An electromagnetic beam emitter 101, such as a laser emitter, is positioned so that it maintains focus on the gimbal's center of rotation C and then strikes the parabolic mirror 104. An emitter 101 may include a lens optic 111 designed to focus the emitted beam. So long as the beam's focus is maintained on the focal point 103 of the parabolic mirror and from there the beam strikes the parabolic mirror 104, any angular movement 120 of the emitter 101 is translated to parallel lateral movement 122 once the beam 105 reflects off the parabolic mirror 104.

The gimbal 102 may be further stabilized by an electric-powered gyroscope attached to the parabolic mirror 104 via a nutation link, or by a closed-loop feedback system (such as that used in an electronic accelerometer, using at least two servo motors, one for each axis of rotation), or by any other means known in the art. The use of electric-powered gyroscopes and closed-loop feedback systems to stabilize gimbals is well known in the art and therefore need not be further described or shown herein.

Figure 2:
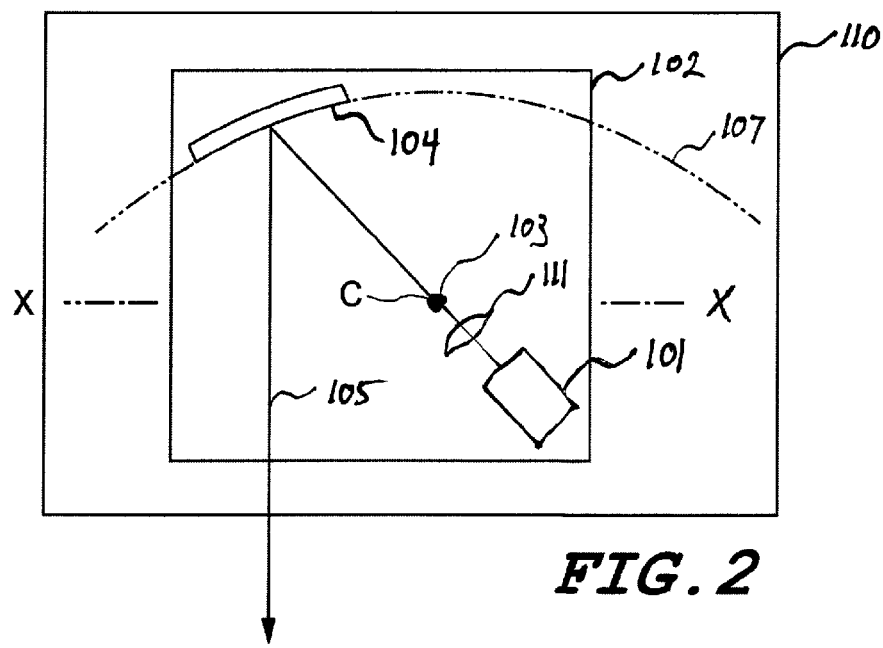
FIG. 2 is a plan/diagrammatic view of the device shown in FIG. 1.

In an example embodiment of the invention, shown in FIGS. 1 and 2, in order to maintain focus on the gimbal's center of rotation C, the emitter 101 is fixed inside the gimbal 102 so that it is isolated from rotation of the device housing 110 around the gimbal and its focal point is maintained on the gimbal's center of rotation C.

However, for convenience and practical purposes, it is likely to be desirable to move the emitter 101 to a different location in the device 100 or conceivably even outside the device. For one thing, fixing an emitter 101 within a gimbal 102 may be impractical as emitters are likely to be relatively bulky and heavy, among other things. Therefore, repositioning optics such as a flat mirror 106, a system of flat mirrors, or a system of mirrors and lenses, are used to reposition the beam so that it will strike the parabolic mirror 104 and its focal point will coincide with the gimbal's center of rotation C and focal point of the parabola 107. In essence, the focused electromagnetic beam 105 will reflect (or be transmitted) from that focal point onto the parabolic mirror 104, which will stabilize the beam 105 as described. Use of mirrors and lenses to reposition and control the focus of a beam is well known in the art and need not be further described. In this way, the emitter may be placed wherever desired for packaging reasons, ergonomic reasons or other engineering or design considerations without adversely affecting beam stabilization.

Figure 3:
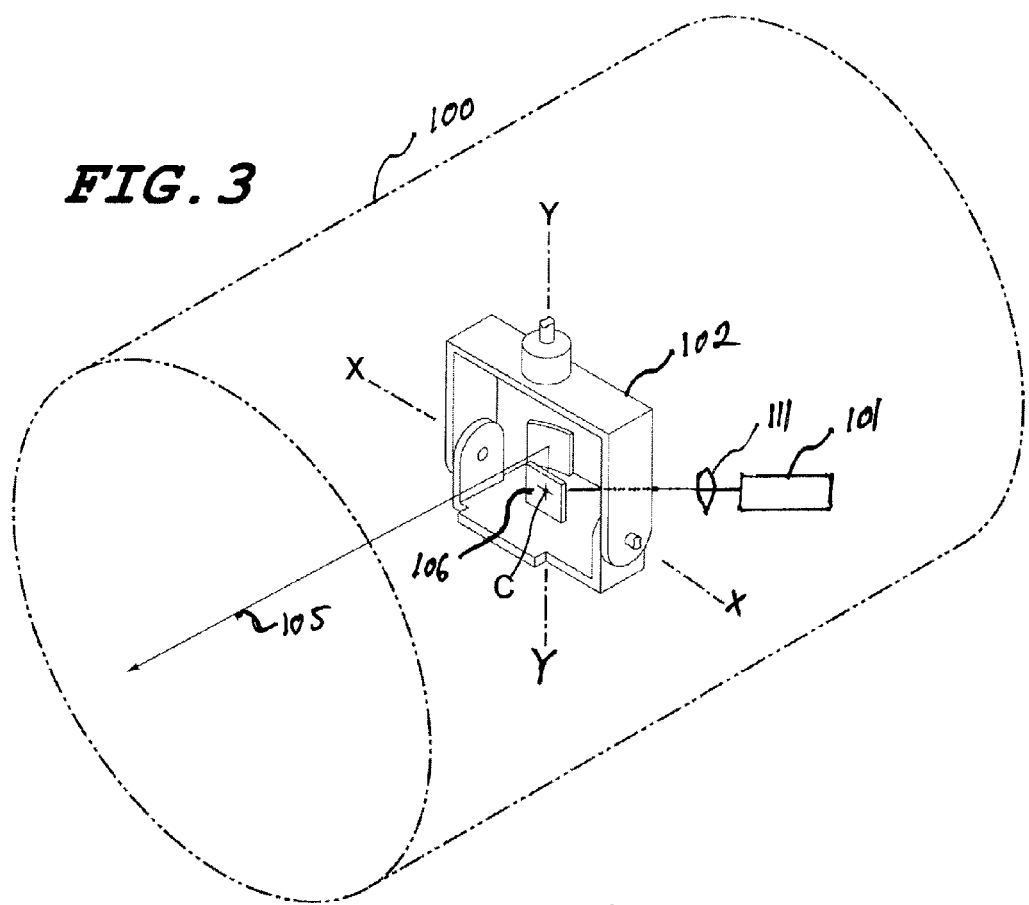
FIG. 3 is a front right isometric view of an alternate embodiment of the invention for beam stabilization using a parabolic mirror and a flat mirror.
Figure 4:
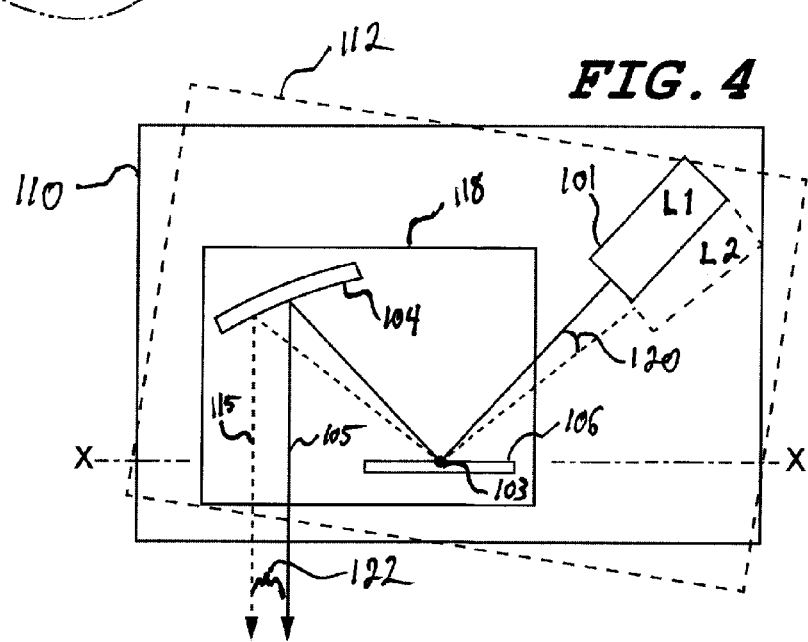
FIG. 4 is a plan/diagrammatic view of the device shown in FIG. 3 showing a first position of the device in solid lines and a second position of the device in phantom.

In FIGS. 3 and 4, repositioning optics in the form of a flat mirror 106 are shown, however repositioning optics may be any mirror, lens, display, or any combination thereof, or any other means of reflecting, transferring or transmitting an electromagnetic beam 105 from one location to another and controlling its focus. Preferably, the electromagnetic beam 105 is focused and then the beam's focal point is repositioned to and maintained at a point coinciding with the gimbal's center of rotation C. Referring now to FIGS. 3 and 4, repositioning optics in the form of a flat mirror 106 are fixed in the place of the laser emitter 101 of FIG. 1, and the emitter 101 is moved to a more convenient location, such as a location on the housing 110 of the device which has space to accommodate it or where it is optimally located for other reasons, such as weight distribution and balance of the overall device. Attachment of the emitter 101 to the housing 110 in FIGS. 3 and 4 is not shown. Both the flat mirror 106 and the parabolic mirror 104 are attached to a gimbal 102 with two axes perpendicular to one another, with the intersection of the gimbal's axes of rotation (i.e., the gimbal's center of rotation) located at the focal point of the parabola. The orientation and location of the flat mirror 106 is fixed in relation to the parabolic mirror 104 so that the gimbal's center of rotation C (which also is the focal point of the parabola 107) falls on its surface opposite the parabolic mirror and so that the flat mirror 106 is capable of receiving a focused electromagnetic beam 105 from the emitter 101 and reflecting it toward the parabolic mirror 104.

Referring now to FIG. 4, the device of FIG. 3 is shown translating significant angular motion 120, shown by beams 105 and 115 emitted from Laser Position 1 (L1) and Laser Position 2 (L2), respectively, to insignificant lateral motion 122, shown by beams 105 and 115, as the beam exits the system via reflection from the parabolic mirror 104. It is to be understood in this example that L2, Laser Position 2 and beam 115 represent the same laser and beam as L1, Laser Position 1 and beam 105 at a later point in time, representing movement of the laser from Position 1 to Position 2 and the corresponding movement of the beam. In this example housing 110 is supporting the emitter 101 at position L1 so that when the housing 110 is moved to different position 112, the emitter 101 moves to position L2.

More specifically, as shown in FIG. 4, one or more lasers 101 is attached to the housing 110 of the device, aimed at the flat mirror and focused on its surface. When a laser beam hits the flat mirror 106, it is reflected onto the parabolic mirror 104, which in turn reflects the beam out of the device, parallel to the optical axis of the device. Because the flat mirror 106 is fixed at the parabola's focal point 103, the parabolic mirror's angle of reflection is constant despite the varying angles of the incoming laser beam due to the laser's rotation (with the device housing 110) around the mirror assembly 118. By thus utilizing the parabolic mirror's unique opticomechanical properties and mounting the mirror assembly 118 on gimbals that isolate it from the rotation of the device housing 110 (and the laser emitter(s) 101 attached thereto), angular movements 120 of the device housing 110 are not transmitted to the beam 105 leaving the device, which remains virtually jitter-free.

Figure 7:
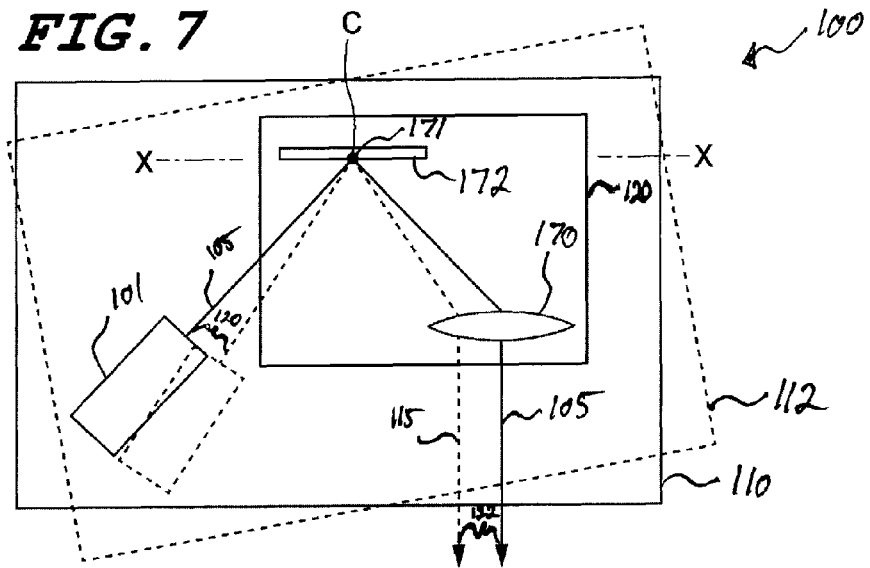
FIG. 7 is a plan/diagrammatic view of an alternate embodiment of the invention for beam stabilization using a flat mirror and a lens, showing a first position of the device in solid lines and a second position of the device in phantom.
Figure 8:
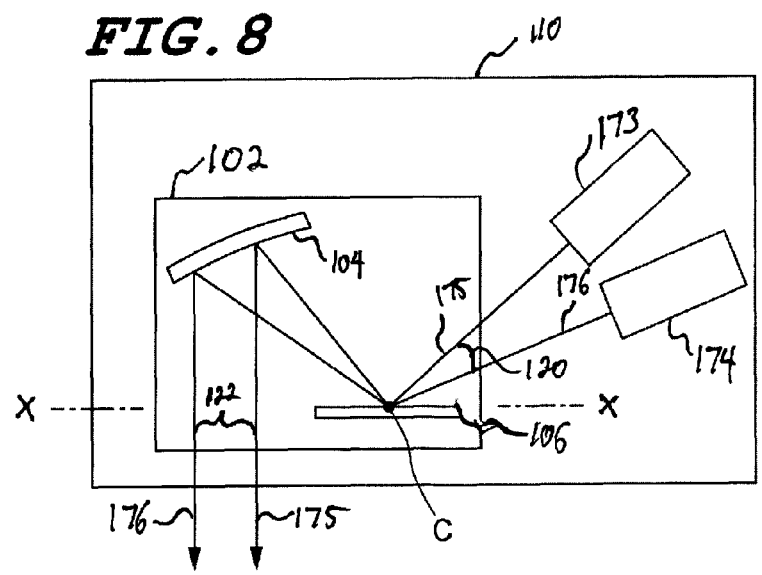
FIG. 8 is a plan/diagrammatic view of an alternate embodiment of the invention for beam stabilization using a flat mirror, a parabolic mirror and two beam emitters.

In another embodiment, shown in FIG. 8, a similar arrangement of gimbal 102, parabolic mirror 104 and flat mirror 106 is used, but instead of a single laser as shown in FIGS. 1-7, multiple lasers, 173, 174 (two shown) are attached to the housing 110 of the device, aimed and focused at the same point on the surface of the flat mirror 106, corresponding to the center of rotation C of the gimbal 102 and the focal point of the parabola. Although the lasers strike the flat mirror 106 at various angles (beams 175 and 176) due to their placement on the housing 110 in series or otherwise, through the novel arrangement of mirrors their beams are simultaneously stabilized and brought into lateral alignment upon reflecting off the parabolic mirror, as shown by beams 175 and 176. Because mirrors are not generally wavelength specific, electromagnetic beams of different wavelengths may be stabilized and aligned using the same mirror assembly, leading to significant efficiencies of size, weight, cost and energy consumption.

In another embodiment for combining, aligning and stabilizing the beams of multiple lasers, lenses are used to focus the beams of multiple lasers to a single point coinciding with the focal point of a parabolic mirror. More specifically, an array of lenses, having a common focal point coinciding with the focal point 103 of the parabolic mirror, is arranged opposite an array of laser emitters such that the beam of each laser passes through a lens (specific to its wavelength) and is focused on a point coinciding with the focal point of the parabolic mirror 104. From there, each beam strikes the parabolic mirror 104 in such a way that it is reflected and propagates in parallel with the other beams despite their initial differences in angle. Moreover, any angular rotation 120 of the lasers caused by movement of the device housing, for example, is simultaneously translated to insignificant lateral motion 122, resulting in stabilized beams upon reflection off the parabolic mirror, as previously described.

In another embodiment depicted in FIGS. 5 and 6, the mirrors are concentric spherical arcs or complete spheres (not shown). In the case of spherical arcs, terms such as "center" or "radius" or are to be understood to mean the points or properties corresponding to such points or properties of the sphere defined by each such arc. If necessary, such as with complete spheres, the outer surface of the outer, larger sphere is treated to allow the beam to pass through it, and the inner surface is reflective, forming a concave mirror 140. The inner, smaller mirror's reflective surface 131 is convex (the outer surface 131 of the inner mirror 130, in the case of complete spheres) and the second mirror's reflective surface 141 is concave (the inner surface of the outer sphere 140, in the case of complete spheres), and in one example the radius 132 of the smaller sphere 130 is ½ the radius 142 of the larger sphere 140 so that the distance between the mirrors' reflective surfaces is fixed at the focal length of the concave mirror and the reflective surface 131 of the convex mirror 130 faces the reflective surface 141 of the concave mirror 140. The mirror assembly is attached to the gimbal so that the point of rotation of the gimbal's axes C is the (shared) center 116 of the concentric spheres or arcs. The distance between the two spherical mirrors 130 and 140 and the relative size of the two spherical mirrors 130 and 140 may vary to suit the needs of a particular embodiment of the invention. As with other embodiments of the invention, a repositioning optic such as a flat mirror or, as shown in the example embodiment of FIG. 6, a lens 124, may be used to reposition the focal point of the emitted beam 105.

In another embodiment shown in FIG. 7, a lens 170 is used instead of a parabolic mirror and repositioning optics in the form of a flat mirror 172 are used. The flat mirror 172 is fixed in relation to the lens 170 so that the focal point 171 of the lens 170 is on the flat mirror's surface facing the lens, and the lens/mirror assembly is attached to the gimbal 102 so that the point of rotation of the gimbal's axes C is the focal point of the lens 171. An electromagnetic beam emitter 101 is attached to the housing 110 of the device or some other convenient location with its beam 105 aimed at and focused on the flat mirror 172, more specifically, at the focal point of the lens 171 on the flat mirror's surface. Movement of the device housing (shown as 112), and with it the emitter 101 and its beam 115, is shown in phantom representing a second position as in FIG. 4. The lens functions the same as the parabolic mirror in that so long as the beam 105 or 115 comes from (in this case, is reflected from) the lens's focal point 171, then no matter what angles the beam strikes the lens as the emitter shakes, moves and rotates, the beam is refracted through the lens and propagates in parallel so that the angular translation 120 of the beam (105 and 115) caused by the emitter's movement, becomes insignificant lateral translation 122.

Figure 9:
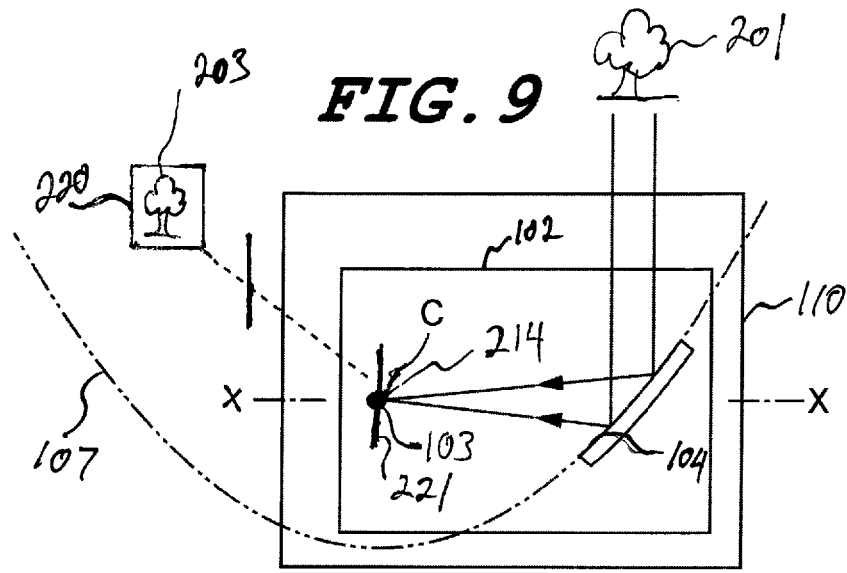
FIG. 9 is a plan/diagrammatic view of an embodiment of the invention for image stabilization using a parabolic mirror.

Referring now to FIG. 9, an example embodiment of the invention for image stabilization is shown. A parabolic mirror 104 is fixed within a multiaxis gimbal 102 so that its focal point 103 coincides with the gimbal's center of rotation C. Light from an object 201 to be viewed strikes the parabolic mirror and reflects a stabilized image to an image plane 221 corresponding to the focal plane 214 of the parabolic mirror 104. The image 203 is stabilized because the parabolic mirror 104 is isolated from rotation of the housing 110 via the gimbal 102 and because the opticomechanical properties of the parabolic mirror translate any angular translation of incoming light rays to lateral translation of the reflected light rays. A viewing element 220 capable of detecting an image 203 to be viewed is configured so that its focal plane 221 coincides with the image plane 214 of the parabolic mirror 104.

Figure 10:
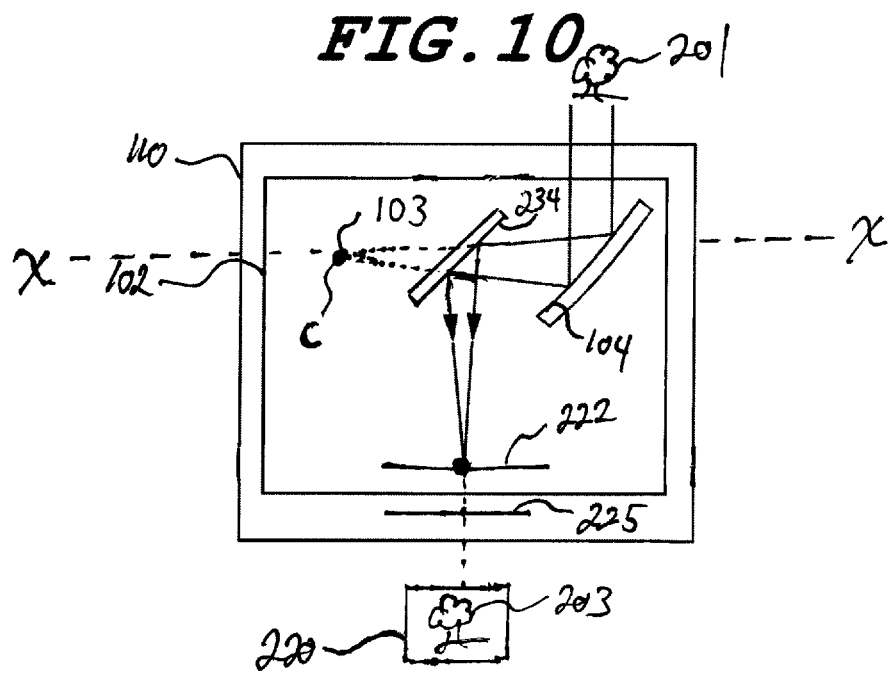
FIG. 10 is a plan/diagrammatic view of an embodiment of the invention for image stabilization using a parabolic mirror and a flat mirror.

In another embodiment shown in FIG. 10, designed for image stabilization, a parabolic mirror 104, a flat mirror 234 and multiaxis gimbal 102 are used. A flat mirror 234 is positioned in fixed relation to the parabolic mirror 104 so as to reposition, or "reimage", the image 203 reflected off the parabolic mirror 104 to a location where it coincides with the focal plane of a view element 222 positioned where otherwise desired, such as an area of the housing that is ergonomically advantageous, well-balanced or convenient for viewing. The reimaging optics may collect the stabilized image from the focal plane of the parabolic mirror, but the reflected image may be intercepted and reimaged from any plane before or after the focal plane of the parabolic mirror. Via communication with the reimaging optics, in this embodiment a flat mirror 234, the image from the parabolic mirror is reimaged and focused to another plane corresponding to the desired reimaged plane 222, coinciding with the focal plane of the view element. The image may be reimaged to the desired viewing plane through any system of mirrors or lenses desired and the image remains stabilized and stationary relative to the horizon, object or target and isolated from shaking, movement and rotation of the device. The view element may be attached to the gimbal 102 or it may be outside of the gimbal as shown by way of example as viewing plane 225. Use of mirrors, lenses or a combination thereof to focus and reposition an image is well known in the art and need not be further described herein.

This embodiment differs from the FIG. 3 and FIG. 4 embodiment in that instead of a beam emitter 101, the view element 220, here shown as an image sensor, is affixed to the housing 110 or otherwise positioned such that its viewing plane coincides with the image plane 221, i.e. the plane along which the light or other electromagnetic waves reflected from the parabolic mirror is focused, i.e. the focal plane 214 of the parabola 107. Because the center of rotation C of the gimbal 102 is at the focal plane 214 of the parabolic mirror 104 (the image plane 221), it may be considered that the system rotates around the image plane 221 as the housing 110 is moved or shaken and that by repositioning the image plane so that it coincides with the viewing plane 221 of the view element 220, the stabilizing properties of the parabolic mirror 104 are maintained and exploited.

For further clarification, the image 203 is stabilized by the same principle that stabilizes the electromagnetic beam in the embodiments shown in FIG. 1 through 8: Movement or shaking (rotation) caused by movement or shaking of the device housing 110 does not result in a shaking image because the incoming light from the object 201 is reflected by the parabolic mirror 104 to its focal plane 214. And because the parabolic mirror 104 is isolated from movement of the housing 110 by means of the gimbal 102, both the parabolic mirror 104 and its focal plane 214 are relatively stationary and stable relative to the horizon and the object 201 being imaged. In other words, the image plane 214 is relatively stable and stationary despite movement or shaking of the device, so the image 203 likewise is relatively stable and stationary. The image plane 214 may then be moved and focused via reimaging optics to a location corresponding to the focal plane of the viewing element 225, and the relative stability of the image is maintained.

The FIG. 10 embodiment uses reimaging optics in the form of a flat mirror 234 to reposition the focal plane 214 of the parabolic mirror 104 to reflect the stabilized image to the focal plane 222 of the view element 220 (here shown as an image sensor). The flat mirror 234 simply moves the image plane to a more convenient location. It should be apparent to one skilled in the art that any number of mirrors and lenses could be applied in this manner until the image plane is in a position most convenient to the design of the device and the viewer.

Figure 12:
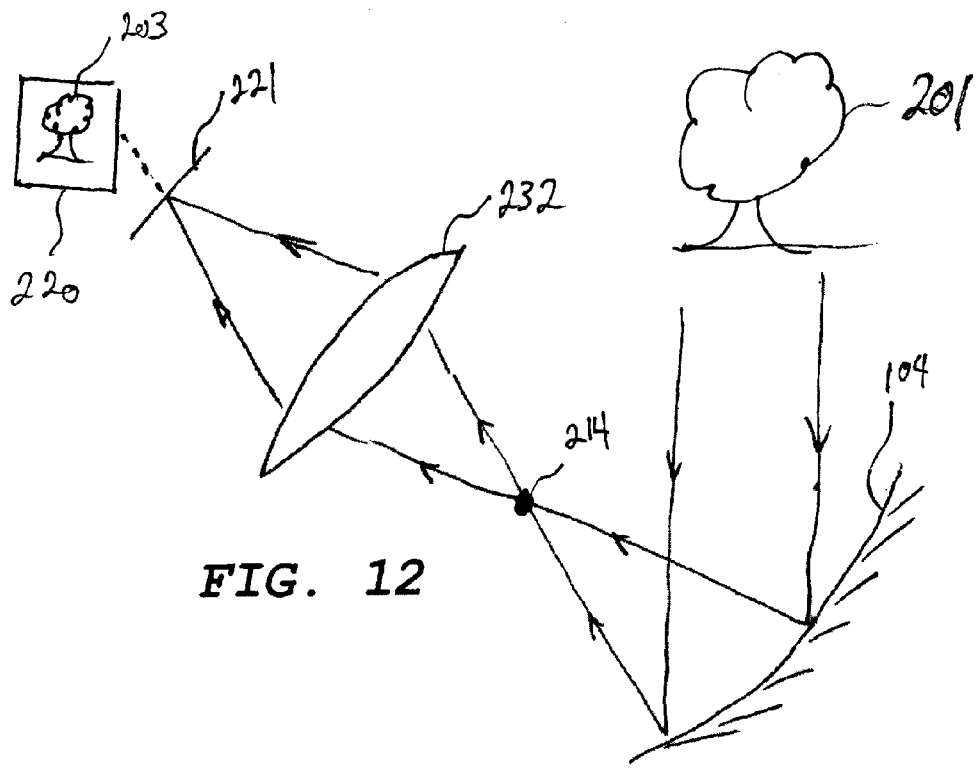
FIG. 12 is a plan/diagrammatic view of an embodiment of the invention for image stabilization using a parabolic mirror and a reimaging lens.
Figure 13:
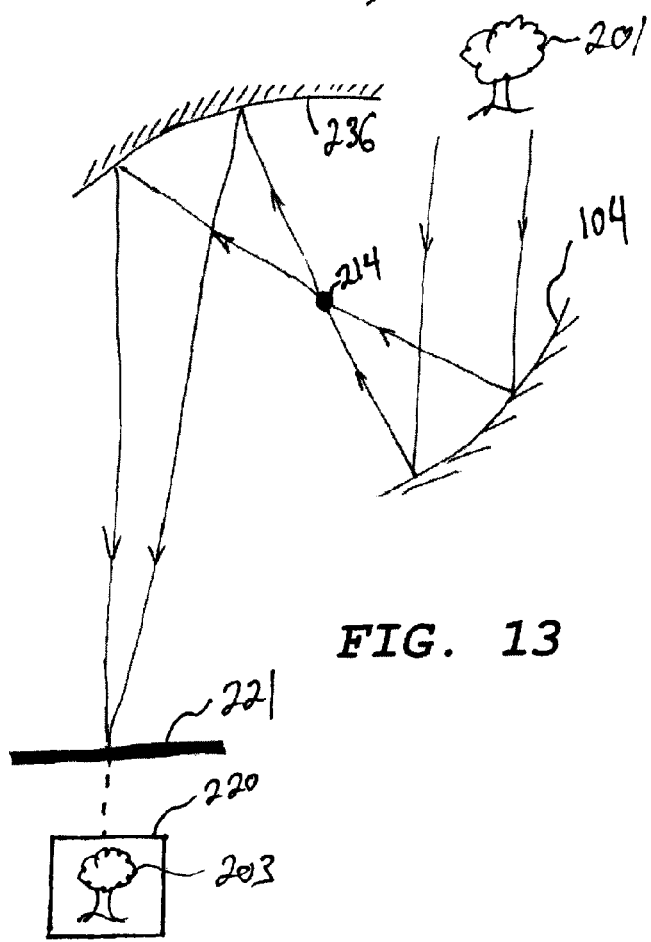
FIG. 13 is a plan/diagrammatic view of an embodiment of the invention for image stabilization using a parabolic mirror and an elliptical mirror.

For example, FIG. 12 and FIG. 13 show reimaging optics that reposition the focal plane of the parabolic mirror 104. In FIG. 12 a lens 232 is used past the focal plane 214 of parabolic mirror 104, resulting in a focal plane that corresponds with the focal plane 221 of the image sensor 220. In a similar manner, FIG. 13 shows an elliptical mirror 236 used as a repositioning or reimaging optic, such that when light from an object 201 reflects off of the parabolic mirror 104 the focal plane 214 of the parabolic mirror is reimaged by elliptical mirror 236 at the focal plane 221 of the image sensor 220.

Figure 14:
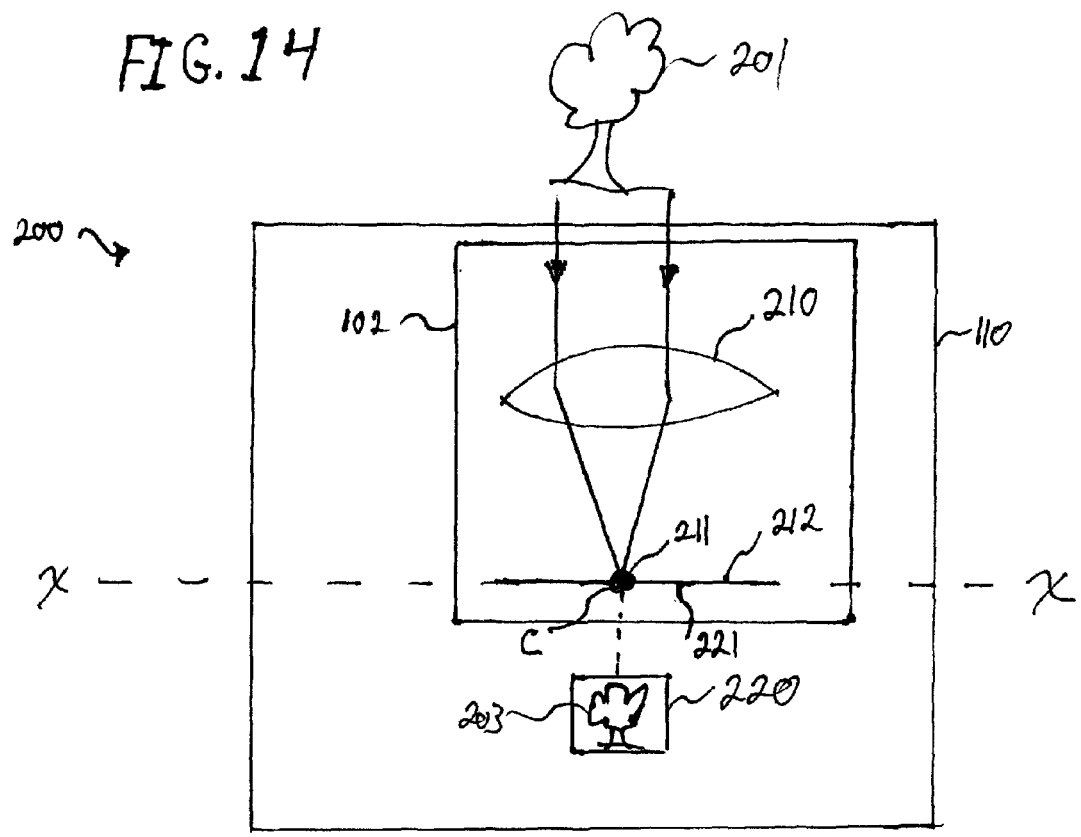
FIG. 14 is a plan/diagrammatic view of an embodiment of the invention for image stabilization using a lens.

The same principal shown in FIG. 7 using a lens can also be used for image stabilization as shown in FIG. 14. A lens 210 may be used in combination with a gimbal 102, with the focal point 211 of the lens, and the focal plane of the lens 212, at the center of rotation of the axis of the gimbal 102. Light from an object 201 that passes through the lens 210 is directed towards the focal plane of the lens 212, which corresponds with the focal plane 221 of the image sensor 220. As with the beam stabilization, the image sensor may be located outside of the gimbal 102, and movement of the housing 110 relative to the object 201, will only result in a small lateral movement of the image 203. Also in a similar manner as the other example embodiments of the image stabilization device 200, the focal plane 212 of the lens 210, may be repositioned or reimaged using reimaging optics.

Figure 11:
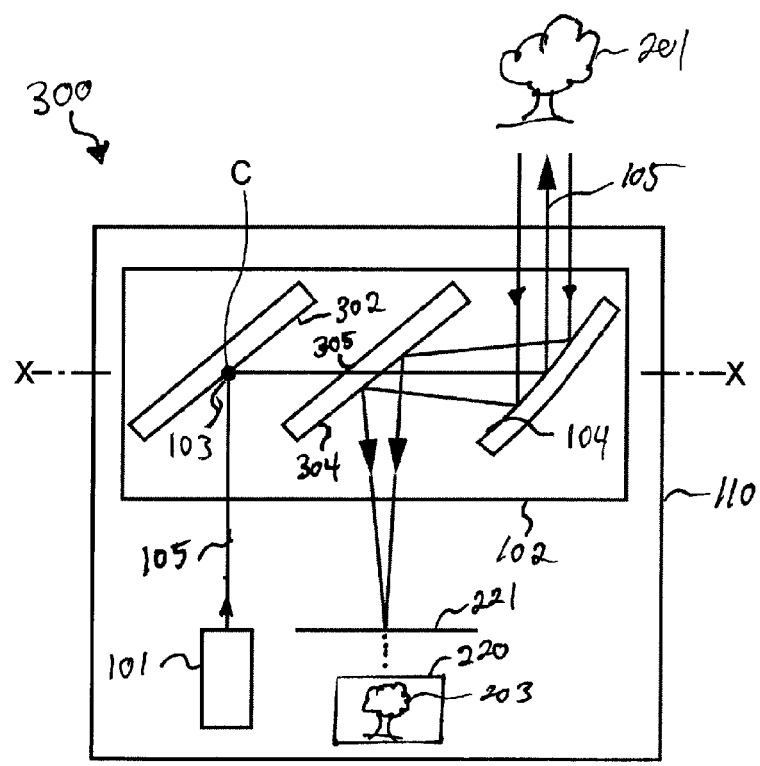
FIG. 11 is a plan/diagrammatic view of an embodiment of the invention for beam and image stabilization.

Referring now to FIG. 11, an embodiment comprising a combination laser stabilization and image stabilization device 300 is shown. Essentially, this embodiment combines the laser stabilization embodiment shown in FIGS. 3 and 4 with the image stabilization embodiment shown in FIG. 10. A parabolic mirror 104 and two flat mirrors 302 and 304 are fixed within a multiaxis gimbal 102 with its center of rotation C coinciding with the focal point 103 of the parabolic mirror 104. The parabolic mirror 104 is positioned so that it is capable of receiving light from an object 201 to be viewed and reflecting it to the second flat mirror 304. The first flat mirror 302 (the beam mirror) is positioned such that the focal point 103 of the parabolic mirror 104 falls on its surface and a beam 105 striking the first flat mirror 302 is reflected to the parabolic mirror 104. An electromagnetic beam emitter 101 is configured so that a beam 105 emitted from it strikes the first flat 302 mirror at the focal point 103 of the parabolic mirror, maintains focus on this point, and is reflected to the parabolic mirror 104, where it is reflected out of the device as a stabilized beam. The second flat mirror 304 (the image mirror) is positioned between the first flat mirror 302 and the parabolic mirror 104 and is configured so that incoming light from an object 201 to be viewed (an image) strikes the parabolic mirror 104 and is reflected to the second flat mirror 304, which reflects (reimages) the image 203 to a more convenient location coinciding with the focal plane 221 of a view element 220. The second mirror 304 is configured so that the surface 305 facing the first mirror 302 is non-reflective and permits the electromagnetic beam(s) 105 to pass through it on its way to the parabolic mirror 104, and so that the surface facing the parabolic mirror is reflective and capable of redirecting light reflected from the parabolic mirror 104 to reposition the image plane (i.e. the focal plane) of the parabolic mirror 104 to coincide with the focal plane 221 of a view element 220. The second flat mirror 304 of the example embodiment in FIG. 11 may be replaced with other reimaging optics as discussed above in relation to FIGS. 9, 10, 12, 13, and 14.

Other embodiments for image stabilization include a system with a lens alone (no mirrors), and a lens and two flat mirrors, for example. Spherical mirrors could also be used for image stabilization, similar to the laser stabilization embodiment shown in FIGS. 5 and 6. Any combination of the elements shown for laser stabilization and image stabilization could be used.

Multiple mirrors or other repositioning and reimaging optics may be used to reposition the beam focal point or the image plane to a location in the device (or outside the device) where it is most convenient for overall design and functionality of the device. The flexibility in configuration and adaptability of the invention to solve many different design challenges and achieve many desired characteristics is one of the major advantages of the invention over current technology.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Insofar as the description above and the accompanying drawings disclose any additional subject matter that is not within the scope of the claims below, the inventions are not dedicated to the public and the right to file one or more applications to claim such additional inventions is reserved.

The invention claimed is:

1. An electromagnetic beam stabilization device comprising
a gimbal having at least two axes of rotation, a first axis of rotation and a second axis of rotation substantially perpendicular to said first axis of rotation, said gimbal having a center of rotation corresponding to the point of intersection between said first axis of rotation and said second axis of rotation and any additional axes of rotation;
at least one parabolic mirror fixed within said gimbal, said parabolic mirror having a focal point that substantially coincides with said center of rotation; and
at least one electromagnetic beam emitter positioned so that a beam maintains focus on a point substantially at said center of rotation and thereafter strikes said parabolic mirror.

2. The device of claim 1 further comprising repositioning optics capable of repositioning each said beam from a first location to a second location where it maintains focus substantially with said center of rotation and thereafter strikes said parabolic mirror.

3. The device of claim 2 wherein said repositioning optics comprise a flat mirror having a reflective surface positioned within said gimbal in fixed relation to said parabolic mirror and said electromagnetic beam emitter such that the focal point of said parabolic mirror falls on the reflective surface of said flat mirror, the focus of the beam emitted from said emitter coincides with said point on the reflective surface of said flat mirror, and said beam reflects off said flat mirror and strikes said parabolic mirror.

4. The device of claim 2 wherein said repositioning optics comprise at least one lens positioned in the path of said beam such that said beam emitted from said electromagnetic beam emitter passes through said lens, wherein the lens redirects the beam to a point substantially coinciding with the focal point of said parabolic mirror, and maintains said focus.

5. The device of claim 1 wherein said electromagnetic beam emitters are lasers.

6. The device of claim 1 further comprising a plurality of electromagnetic wave emitters.

7. The device of claim 6 wherein said plurality of electromagnetic wave emitters each emit waves having different wavelengths from the other said plurality of electromagnetic wave emitters.

* * * * *